United States Patent
Zulauf et al.

(10) Patent No.: US 6,505,597 B2
(45) Date of Patent: Jan. 14, 2003

(54) CLEANSING OIL FILTER CONTAINING QUICK-RELEASE LIQUID ANTIOXIDANT/ADDITIVE SOLUTION, AND METHOD OF USING SAME TO CONVERT AN ENGINE FROM PETROLEUM-BASED OIL TO BOTANICALLY-BASED OIL

(75) Inventors: Gary Zulauf, Findlay, OH (US); Ronald P. Rohrbach, Flemington, NJ (US); Gerard W. Bilski, Perrysburg, OH (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/867,990

(22) Filed: May 30, 2001

(65) Prior Publication Data

US 2002/0179033 A1 Dec. 5, 2002

(51) Int. Cl.$^7$ ............................................. B01D 35/00
(52) U.S. Cl. ..................................................... 123/196 R
(58) Field of Search .......................... 123/196 R, 196 A, 123/1 A, 196 M

(56) References Cited

U.S. PATENT DOCUMENTS

| 3,749,247 | A | * | 7/1973 | Rohde ......................... 210/205 |
|---|---|---|---|---|
| 4,075,097 | A | | 2/1978 | Paul |
| 4,144,166 | A | | 3/1979 | DeJovine |
| 4,144,169 | A | | 3/1979 | Grueschow |
| 4,265,748 | A | | 5/1981 | Villani et al. |
| 4,755,289 | A | | 7/1988 | Villani |
| 5,042,617 | A | * | 8/1991 | Brownawell et al. ... 123/196 A |
| 5,256,280 | A | * | 10/1993 | Anderly et al. ............. 210/130 |
| 5,478,463 | A | * | 12/1995 | Brownawell et al. ... 123/196 A |
| 5,591,330 | A | | 1/1997 | Lefebvre |
| 6,045,692 | A | * | 4/2000 | Bilski et al. ................. 123/1 A |

* cited by examiner

Primary Examiner—Gene Mancene
Assistant Examiner—Hyder Ali

(57) ABSTRACT

A cleansing oil filter includes a housing, a porous filter element disposed in the housing, and a quantity of liquid antioxidant/additive solution in the housing associated with the filter element. Preferably, the filter contains at least 10 ml of antioxidant, and more preferably, between 20 and 100 ml of antioxidant. A substantial quantity of the liquid antioxidant/additive solution is available for immediate release when oil flows through the filter. A method of converting an internal combustion engine from a petroleum-based lubricating oil to a botanically-based lubricating oil involves draining a petroleum-based lubricating oil out of the engine, removing an oil filter from the engine and replacing it with a first cleansing filter having a quantity of liquid antioxidant/additive solution therein, adding a first batch of a botanically-based lubricating oil to the engine, running the engine until warm, and replacing the oil and filter a second time using botanically-based oil.

7 Claims, 2 Drawing Sheets

CLEANSING OIL FILTER CONTAINING QUICK-RELEASE LIQUID ANTIOXIDANT/ADDITIVE SOLUTION, AND METHOD OF USING SAME TO CONVERT AN ENGINE FROM PETROLEUM-BASED OIL TO BOTANICALLY-BASED OIL

BACKGROUND OF THE INVENTION

1. Field of the Invention

The present invention relates to an oil filter for an internal combustion engine, the oil filter containing a quantity of a liquid antioxidant/additive solution to be released when oil flows through the filter. The present invention also relates to a method of converting an internal combustion engine from petroleum-based oil to botanically-based oil, using the described filter.

2. Description of the Background Art

A number of oil filters containing oil-improving additives are known. The known oil filters of this type are primarily adapted to slowly release the additives over time, as hot oil is circulated through the filter. Examples of some of these types of oil filters include U.S. Pat. No. 4,075,097 to Paul, U.S. Pat. No. 4,144,166 to De Jovine, U.S. Pat. No. 4,144,169 to Grueschow, U.S. Pat. No. 4,265,748 to Villani et al, U.S. Pat. No. 4,755,289 to Villani, and U.S. Pat. No. 5,591,330 to Lefebvre.

Many of the above patents disclose oil filters having either a dissolving additive body, or a reservoir of oil additive materials therein, to supplement additives originally present in the oil, over time.

Where a solid dissolving additive body is used, it is provided to slowly and continuously add beneficial additives to engine oil, substantially replacing or supplementing the additives originally present in the oil.

Where a reservoir of material is used, a restraining structure such as a check valve, a dissolvable diaphragam, or other structure is also provided to limit the rate at which the additive material is fed into the crankcase oil supply.

Although the known oil filters have some utility for their intended purposes, a need still exists in the art for an oil filter having a quick-release liquid additive material therein.

In particular, there is a need for an effective and reliable method of converting an internal combustion engine from a petroleum-based lubricating oil to a botanically-based lubricating oil, and for an oil filter which is adapted to be usable in effecting such a conversion.

SUMMARY OF THE INVENTION

In a first embodiment hereof, the present invention provides a cleansing oil filter containing a liquid antioxidant/additive solution.

A filter according to the present invention, generally, includes a housing including a substantially cup-shaped shell and a tapping plate sealingly attached to the shell.

A filter according to the present invention also includes a porous filter element disposed in the housing, and a quantity of liquid antioxidant/additive solution in the housing, operatively associated with the filter element. Preferably, the filter contains at least 10 ml of antioxidant/additive solution, and more preferably, between 20 and 100 ml of antioxidant/additive solution.

A substantial quantity, and preferably a majority, of the liquid antioxidant/additive solution is available for substantially immediate release when oil flows through the filter.

In a second embodiment hereof, the present invention also relates to a method of converting an internal combustion engine from a petroleum-based lubricating oil to a botanically-based lubricating oil.

A method according to the present invention includes the steps of:

a) draining a petroleum-based oil out of the engine;

b) removing an oil filter from the engine and replacing it with a first cleansing oil filter having a quantity of liquid antioxidant/additive solution therein, a substantial amount of said liquid antioxidant/additive solution available for substantially immediate release when oil flows through the filter;

c) adding a first batch of a botanically-based lubricating oil to the engine;

d) running the engine for a predetermined time period;

e) shutting the engine off;

f) draining the first batch of botanically-based lubricating oil out of the engine;

g) removing said first cleansing oil filter and replacing it with a second cleansing oil filter having a quantity of liquid antioxidant/additive solution therein, a substantial amount of said liquid antioxidant/additive solution available for immediate release when oil flows through the filter; and h) adding a second batch of botanically-based lubricating oil to the engine.

Additional oil and filter changes may be performed, if needed, to completely flush the engine of petroleum-based deposits.

Preferably, the botanically-based lubricating oil used, in the method according to the invention, includes an oil selected from the group consisting of vegetable oils, canola oil, corn oil, cottonseed oil, olive oil, peanut oil, sunflower oil, safflower oil, and mixtures thereof.

Accordingly, it is an object of the present invention to provide a method and filter apparatus for converting an internal combustion engine from a petroleum-based lubricating oil to a botanically-based lubricating oil.

It is a further object of the invention to provide a cleansing filter containing an immediately available antioxidant/additive solution to aid in removing and inactivating lead and other petroleum-based deposits from inner surfaces of an engine.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE PREFERRED EMBODIMENT

The Filter

Figure 1:
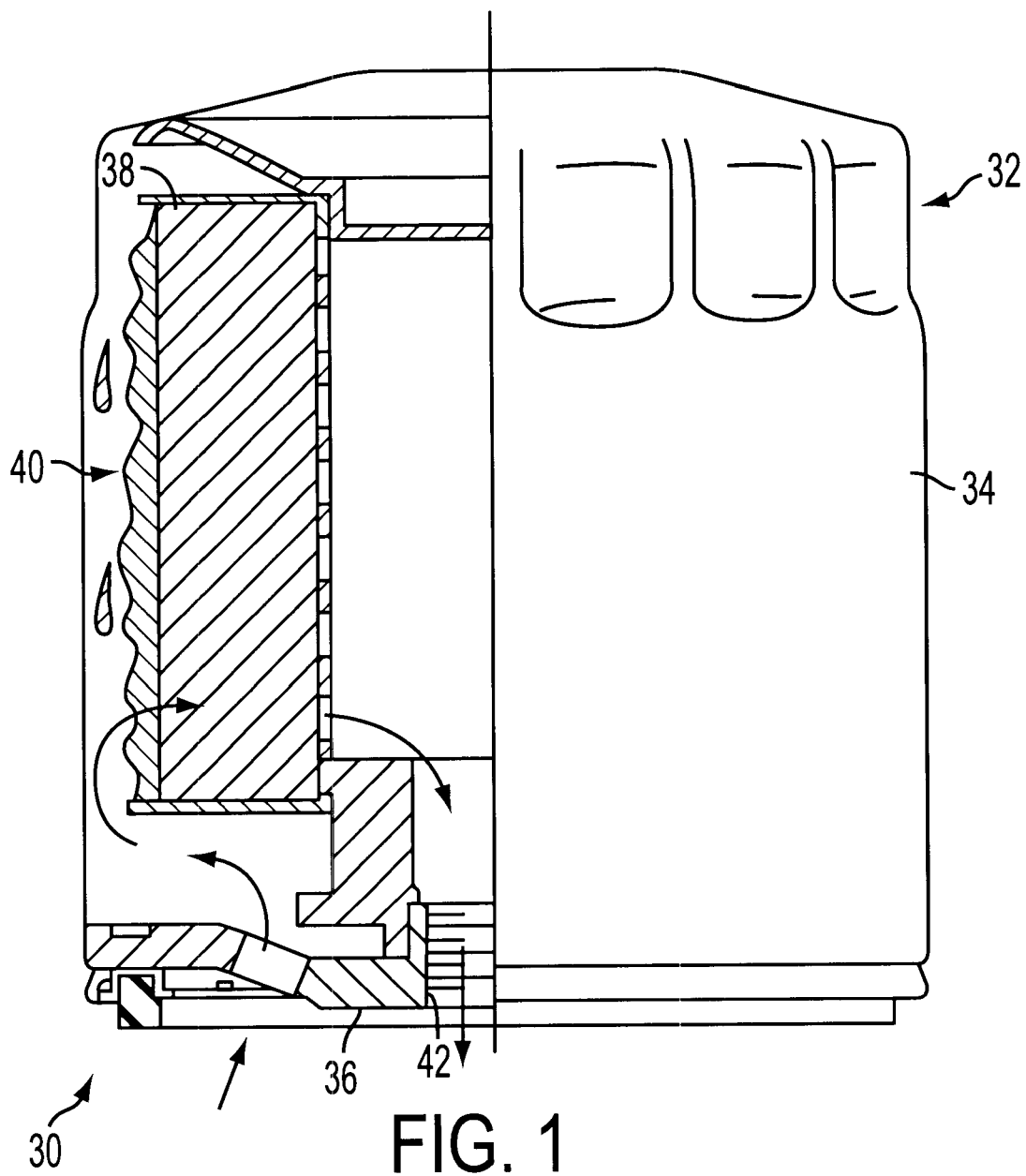
FIG. 1 is a side plan view, partially in cross-section, of a cleansing oil filter in accordance with a first embodiment of the present invention.

Referring now to FIG. 1 of the drawings, a cleansing oil filter, according to a first embodiment of the present invention, is shown generally at 30. The filter 30 includes a housing 32, made up of a substantially cup-shaped shell 34, and a tapping plate 36 sealingly attached to the shell. The filter 30 also includes a porous filter element 38 disposed in the housing 32, and a quantity of a liquid antioxidant/additive solution 40 in the housing, operatively associated with the filter element.

Preferably, the filter contains at least 10 ml of antioxidant/additive solution, and more preferably, between 20 and 100 ml of antioxidant/additive solution.

The liquid antioxidant/additive solution 40 must contain at least one antioxidant, but may, optionally, contain a mixture of antioxidants and/or may also contain one or more additional beneficial additives such as corrosion inhibitors, antioxidants, metal scavengers, chelating compounds, friction modifiers, pour point depressants, detergents, dispersants, viscosity index improvers, anti-wear agents, and/or extreme pressure additives, as desired to fit a particular application.

Useful antioxidants may be selected from the group consisting of phenolic compounds, arylamino compounds, substituted thiazoles, substituted thiadiazoles, phosphosulfurized olefins, zinc dithiophosphates, and zinc dialkyl dithiophosphates, aromatic sulfides, aromatic polysulfides, alkyl sulfides, alkyl polysulfides, sulfurized olefins, sulfurized carboxylic acid esters, and sulfurized ester-olefins, and mixtures thereof.

Although the above-described antioxidants are preferably in liquid form, they may also be used in solid form, either as solid compounds or mixed with a solid carrier or binder. Useful antioxidants that can be incorporated into a filter in solid form include imidazoline-phosphonate salts, substituted triazoles, sulfurized carboxylates, phenolic compounds, arylamino compounds, substituted thiazoles, substituted thiadiazoles, phosphosulfurized olefins, zinc dithiophosphates, and zinc dialkyldithiophosphates, aromatic sulfides, aromatic polysulfides, alkyl sulfides, alkyl polysulfides, sulfurized olefins, sulfurized carboxylic acid esters, and sulfurized ester-olefins, and mixtures thereof. Preferred binders in the practice of the present invention are thermoplastics. Particularly preferred binders include polyamides, polyimides, polyesters, polyolefins, polysulfones, and mixtures thereof.

Examples of specific commercially available compositions which have been found to be usable as beneficial additives in the practice of the present invention include the chelating metal deactivators sold by Ciba-Geigy under the trademark IRGAMET, particularly IRGAMET 30, the composition sold by the Lubrizol company as LUBRIZOL 7652, and mixtures of the above with each other and with antioxidants selected from the above list.

Although the antioxidant/additive solution 40 is shown in the drawing as resting on the surface of the filter element 38, the figure is drawn that way for illustrative purposes, and it will be understood that in practice, the antioxidant/additive solution will in all likelihood be soaked up by, and adsorbed onto, the sorbent filter media of the filter element 38.

A substantial quantity, preferably a majority, of the liquid antioxidant/additive solution 40 is available for substantially immediate release when oil flows through the filter.

The Method

The present invention also relates to a method of converting an internal combustion engine from a petroleum-based lubricating oil to a botanically-based lubricating oil.

A method according to the present invention includes the steps of:
a) draining a petroleum-based oil out of the engine;
b) removing an oil filter from the engine and replacing it with a first cleansing oil filter having a quantity of liquid antioxidant/additive solution therein, a substantial amount of said liquid antioxidant/additive solution available for substantially immediate release when oil flows through the filter;
c) adding a first batch of a botanically-based lubricating oil to the engine;
d) running the engine for a predetermined time period;
e) shutting the engine off;
f) draining the first batch of botanically-based lubricating oil out of the engine;
g) removing said first cleansing oil filter and replacing it with a second cleansing oil filter having a quantity of liquid antioxidant/additive solution therein, a substantial amount of said liquid antioxidant/additive solution available for immediate release when oil flows through the filter; and
h) adding a second batch of botanically-based lubricating oil to the engine.

Figure 2:
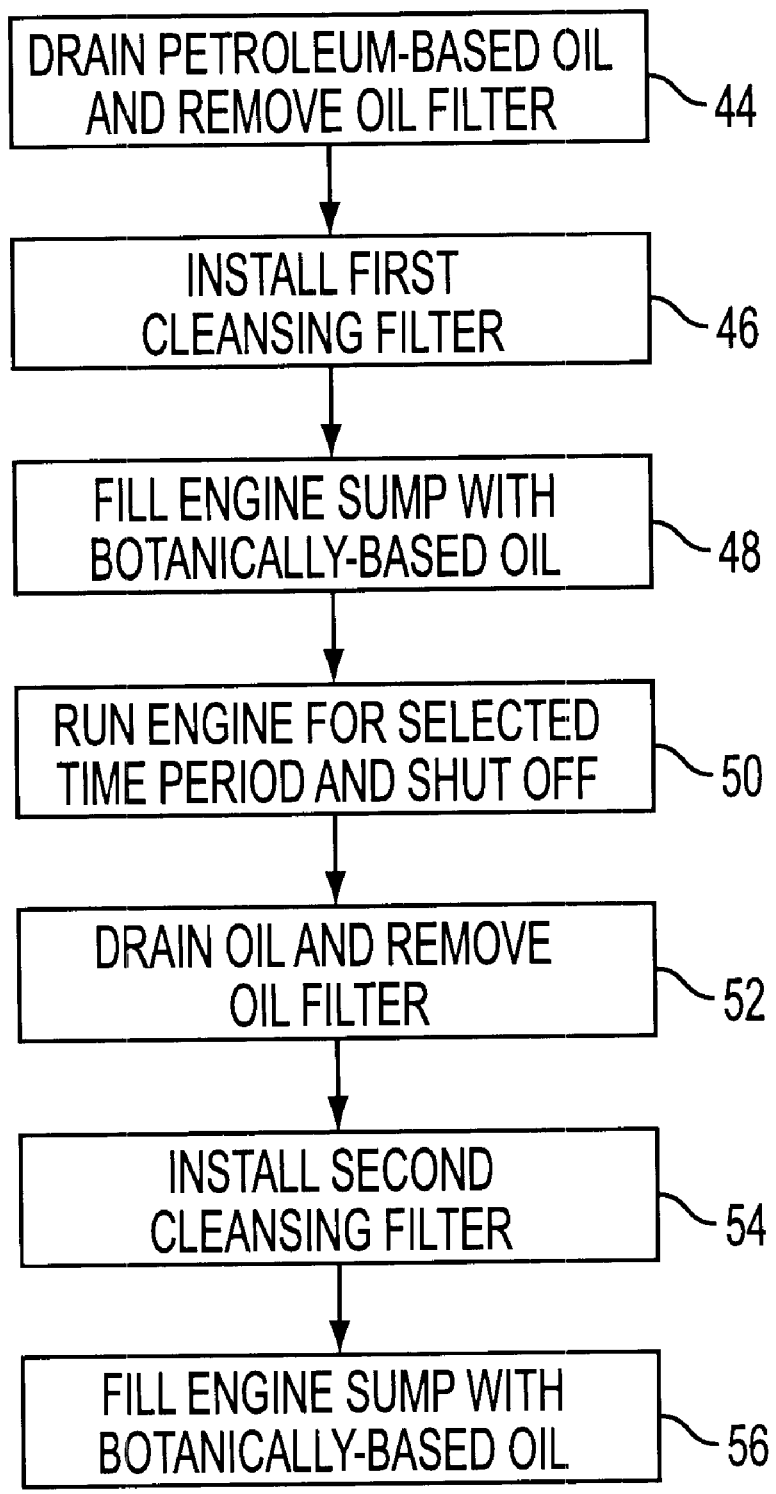
FIG. 2 is a block diagram showing a preferred sequence of steps in a method of converting an internal combustion engine from a petroleum-based lubricating oil to a botanically-based lubricating oil in accordance with a second embodiment of the invention.

The combined step of draining the original, petroleum-based oil and removing the associated oil filter is shown at 44 in the block diagram of FIG. 2. This involves manually removing the oil drain plug from the oil pan, and draining the oil into a catch basin, drip pan or tray in the normal way. After all of the oil has drained out of the oil pan, the drain plug is replaced and tightened to manufacturer's suggested torque specifications.

Then, the step of installing a first cleansing filter is shown at 46 in FIG. 2. Preferably, the first cleansing filter is substantially the same as the filter 30 shown in FIG. 1 and previously described.

However, it is noteworthy that in following the method according to the invention, the cleansing filter installation step 46 may, alternatively, be accomplished by taking a dry off-the-shelf production oil filter and manually adding an appropriate amount of a liquid antioxidant/additive solution 40 into the filter housing before installing it on the engine.

This may be accomplished by, for example, inverting the filter 30 from the orientation shown in FIG. 1 and pouring a measured quantity of the solution into the outlet hole 42 formed in the center of the tapping plate 36.

The step of adding a first batch of botanically-based oil to the engine is shown at 48 in FIG. 2. Preferably, the botanically-based lubricating oil used, in the method according to the invention, includes a botanically-derived base oil selected from the group consisting of vegetable oils, canola oil, corn oil, cottonseed oil, olive oil, peanut oil, sunflower oil, safflower oil, and mixtures thereof. The base oil is further modified by the addition of selected additives such as detergents, dispersants, viscosity modifiers, extreme pressure additives, wear-resistant additives, etc.

The first oil-adding step 48 is followed by a first flushing step 50 of running the engine for a selected time period. This selected time period should at least be long enough for the engine to reach operating temperature. In a vehicle, this first oil flushing step may last between one day and two weeks.

The first flushing step 50 is followed by a second draining step 52, a second cleansing filter installation step 54, and a second filling step 56 in which the engine oil sump is filled a second time with the selected botanically-based lubricating oil.

Additional oil changes and flushing steps may be used in accordance with the method of the invention, where appropriate.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A method of converting an internal combustion engine from a petroleum-based lubricating oil to a botanically-based lubricating oil, comprising the steps of:

a) draining a petroleum-based oil out of the engine;

b) removing an oil filter from the engine and replacing it with a first cleansing oil filter having a quantity of liquid antioxidant/additive solution therein, a substantial amount of said liquid antioxidant/additive solution available for immediate release when oil flows through the filter;

c) adding a first batch of a botanically-based oil to the engine;

d) running the engine for a predetermined time period;

e) shutting the engine off;

f) draining the first batch of botanically-based oil out of the engine;

g) removing said first cleansing oil filter and replacing it with a second cleansing oil filter having a quantity of liquid antioxidant/additive solution therein, a substantial amount of said liquid antioxidant/additive solution available for immediate release when oil flows through the filter; and h) adding a second batch of botanically-based oil to the engine.

2. The method of claim 1, wherein said botanically-based oil comprises an oil selected from the group consisting of vegetable oils, canola oil, corn oil, cottonseed oil, olive oil, peanut oil, sunflower oil, safflower oil, and mixtures thereof.

3. The method of claim 1, wherein each of the first and second cleansing oil filters is the oil filter of claim 1.

4. An internal combustion engine system comprising
an internal combustion engine,
a quantity of botanically-based oil for lubricating moving parts in said engine, and
a filter for filtering particulate matter from said botanically-based oil, said filter including a liquid antioxidant disposed in the filter so that said botanically-based oil comes into contact with the antioxidant during operation of the engine.

5. The internal combustion engine system of claim 4 wherein said botanically-based oil comprises an oil selected from the group consisting of vegetable oils, canola oil, corn oil, cottonseed oil, olive oil, peanut oil, sunflower oil, safflower oil, and mixtures thereof.

6. An internal combustion engine system comprising
an internal combustion engine,
a quantity of botanically-based oil for lubricating moving parts in said engine, and
a filter for filtering particulate matter from said botanically-based oil, said filter including a liquid antioxidant disposed on or in a solid carrier disposed in the filter so that said botanically-based oil comes into contact with the antioxidant during operation of the engine.

7. An internal combustion engine system comprising
an internal combustion engine,
a quantity of botanically-based oil for lubricating moving parts in said engine, and
a filter for filtering particulate matter from said botanically-based oil, said filter including an antioxidant disposed in the filter so that said botanically-based oil comes into contact with the antioxidant during operation of the engine, wherein said antioxidant is selected from the group consisting of phenolic compounds, arylamino compounds, substituted thiazoles, substituted thiadiazoles, phosphosulfurized olefins, zinc dithiophosphates, and zinc dialkyl dithiophosphates, aromatic sulfides, aromatic polysulfides, alkyl sulfides, alkyl polysulfides, sulfurized olefins, sulfurized carboxylic acid esters, and sulfurized ester-olefins, and mixtures thereof.

* * * * *